United States Patent

[11] 3,624,307

[72] Inventors Michael Frank Sikorsky
Neptune City;
Herman Ewald Voigt, Middletown, both of N.J.

[21] Appl. No. 2,578
[22] Filed Jan. 13, 1970
[45] Patented Nov. 30, 1971
[73] Assignee Bell Telephone Laboratories, Incorporated
Murray Hill, N.J.

[54] CALL TRANSFER SYSTEM
31 Claims, 12 Drawing Figs.

[52] U.S. Cl. .......... 179/27 FF,
179/18 BD
[51] Int. Cl. .......... H04m 3/42,
H04m 3/58
[50] Field of Search .......... 179/27 FG,
27 FF

*Primary Examiner*—William C. Cooper
*Attorneys*—R. J. Guenther and James Warren Falk

ABSTRACT: A telephone system is disclosed having a plurality of operator assistance positions together with facilities for transferring calls in a hold state between positions. These facilities are effective to transfer both the speech circuitry for the call as well as a lamp display of call status information to the new position.

INVENTORS:
M. F. SIKORSKY
H. E. VOIGT
BY Donald M Duft
ATTORNEY

CALL TRANSFER SYSTEM

This invention relates to a telephone switching system, and in particular to a system equipped with a plurality of operator positions for furnishing various types of assistance on calls served by the system. This invention further relates to a system equipped with improved facilities for transferring calls between operator positions.

BACKGROUND OF THE INVENTION

Telephone switching systems are known having a plurality of operator positions for providing call assistance. Such assistance is required on operator dialed calls as well as on person-to-person and other types of customer dialed calls whose completion requires service above and beyond the establishment of a connection to the called station. On many calls, operator assistance is required only briefly and upon the furnishing of service requested of her the operator is disconnected from the connection and is made available to serve other calls. Other types of calls, such as those of the time and charges type, require the continued attention of the operator so that the calling party may be notified of the call charges immediately upon its termination. These calls are typically served by placing the call in what is termed a "hold-state" after the desired call connection has been established. From then on, no further assistance is required until the call terminates. At that time, the operator takes the call out of hold and informs the calling party of the call charges.

It is often a problem in such systems when held calls continue for a prolonged period of time. In some cases, an operator may desire to go off duty while there are still one or more calls on hold at her position. If the operator abandons her position prior to the termination of such calls, it is then necessary for an operator at an adjacent position to observe the status and progress of the calls at the abandoned position and to render any further service required by leaning over and operating the appropriate keys at the abandoned position. In some systems, the operator at the adjacent position must also use the headset of the abandoned position to converse with the calling party. In other systems, call transfer keys are provided which interconnect the speech circuitry of the two positions. However, even when such transfer facilities are provided, the held calls at the abandoned position must still be served by observing the lamps and operating the keys of the abandoned position, This is an undesirable arrangement since the operator at the adjacent position must also continue to serve whatever calls are extended to her position by the system.

It is therefore an object of the invention to provide improved facilities for serving held calls in operator assistance type systems.

It is a further object to provide improved facilities for serving a hold call at a position which becomes abandoned prior the call's termination.

It is a further object to provide improved facilities for transferring calls in a held state between the different operator positions of the system.

SUMMARY OF THE INVENTION

In accordance with the disclosed illustrative embodiment of our invention, we provide improved facilities which enable a call on hold at a first position to be transferred to another position and then served thereat in identically the same manner as if it had originally been extended to the other position. Each position in the system has a position transfer key individual to another operator position such as, for example, an adjacent position. The depression of this key by an operator at an active position activates our call transfer facilities so that the calls on hold at the adjacent position are transferred to the active position where they are then served in the conventional manner.

Further, in accordance with our invention, a stored program controlled system is provided with memory or register facilities unique to each trunk circuit and unique to each operator position. The provision of these facilities associates each trunk circuit serving a call in a held state with the position that placed the call on hold. The portion of memory that stores the trunk information is termed the trunk register. There is a trunk register for each trunk circuit and each trunk register stores information indicating the position serving the call to which the trunk circuit is currently connected. The portion of memory that stores the operator position information is termed a position register and there is one such register for each operator position. Included in the information stored by this register is the identity of the trunk circuit with which the position is currently associated.

When it is desired to transfer a held call such as, for example, from an abandoned to an active position, the depression of the position transfer key at the active position causes the identity of the new position to be entered into the trunk register for the held call, and further causes certain of the information in the register of the vacated position to be transferred to the register of the active position. With the entry of the new information in the trunk register and with the transfer of the position register information from the abandoned to the active position, the held call is then associated exclusively with the new position. Subsequently, when the held state of the call terminates, the system operates under control of the trunk register and position register information to extend the call to the active position rather than to the abandoned position.

Our invention is additionally advantageous in that it permits a held call associated with an inoperative position to continue to be served. In the prior art systems, any call connected to an inoperative position was released immediately since the system had no capability of reassociating it with another position. In accordance with our invention, upon detecting the inoperable state of a position that has placed a call on hold, the system continues to store new information in the trunk and position registers in the same manner as if the position were still operable. Subsequently, when additional service is required on the call, the operator at the adjacent position may operate her position transfer key to transfer the held call at the defective position to her position where it may then receive further service.

Features of our invention are:

1. the provision of facilities for transferring a call from a first to a second operator position;

2. the provision of facilities for initiating the transfer operation under control of an operator at the position to which the call is to be transferred;

3. the provision of information storage facilities unique to each trunk circuit for storing information indicating the position associated with a call being served by the trunk circuit;

4. the provision of information storage facilities individual to each operator position for registering information indicating the identity of the trunk circuits serving the calls currently associated with the position;

5. the provision of facilities effective upon the depression of a position transfer key at a transferee position for transferring hold calls from another abandoned position by writing in the trunk register of the held call the identity of the active transferee position and by transferring at least some of the contents of the position register of the other position to the position register of the transferee position;

6. the provision of facilities for precluding the requested transfer if the transferee position is currently not in an operable state; and 7. the provision of facilities for determining that the number of held calls at the other position is not in excess of the available call serving facilities at the transferee position before the transfer is effected.

DESCRIPTION OF THE DRAWING

These and other objects and features of the invention will be more readily understood upon a reading of the following description thereof taken in conjunction with the drawing in which FIGS. 1A and 1B, when arranged as shown on FIG. 1C, diagrammatically disclose a system embodying our invention.

GENERAL DESCRIPTION—FIGS. 1A AND 1B

Figure 1A:
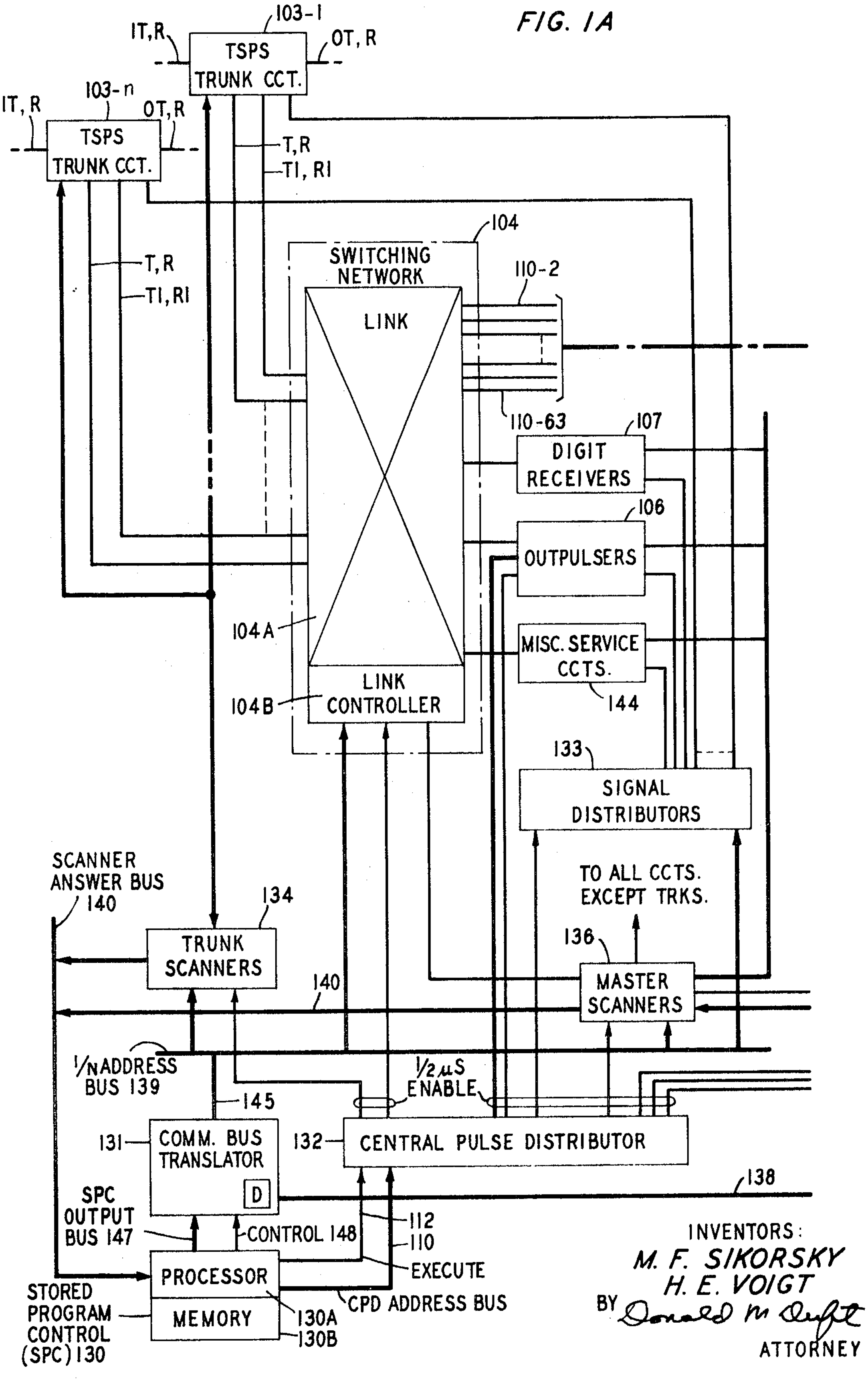
Figures 1B, 1C:
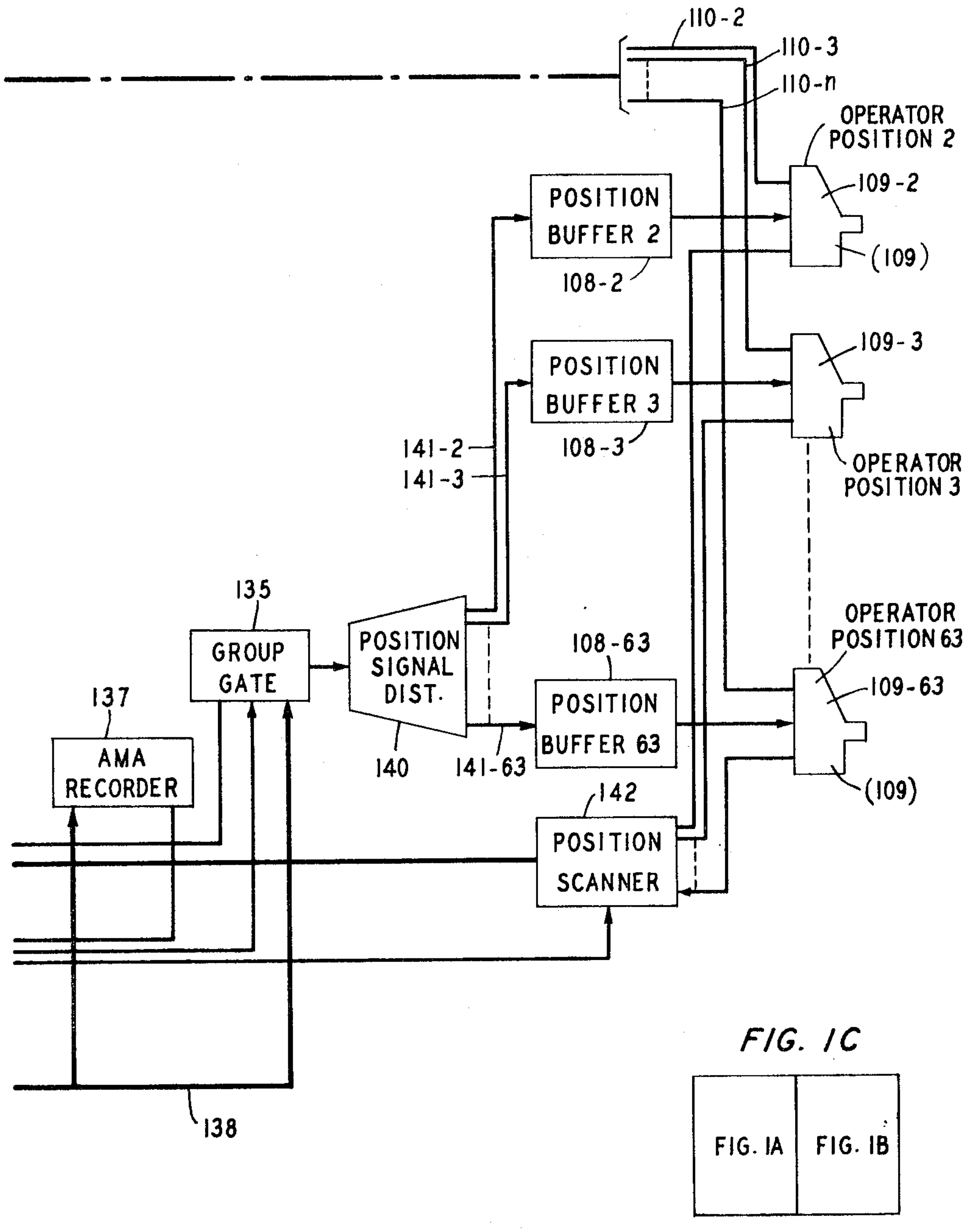

FIGS. 1A and 1B diagrammatically disclose a system in which our invention may ideally be embodied. This system is disclosed in further detail in the Jaeger-Joel application, Ser. No. 519,787, filed Jan. 10, 1966, now U.S. Pat. No. 3,484,560, issued Dec. 16, 1969. This application is incorporated as part of the present specification to the same extent it is fully disclosed herein.

Shown on FIGS. 1A and 1B is a Traffic Service Position System (TSPS) center 100 (TSPS) a plurality of trunk circuits 103–1 through **103–*n***. Each trunk circuit may be connected on its left or incoming side to circuits (not shown) from which the TSPS center receives calls, each trunk circuit may also be connected on its right or outgoing side to circuits (not shown) to which the TSPS center may extend the calls it receives.

The TSPS center further includes a switching network 104, which is connected on its left side to trunk circuits 103 and on its right side to various other circuits, such as outpulsers 106, digit receivers 107, positions 108–, and miscellaneous other circuits which, for the purpose of this figure, are represented generally as miscellaneous service circuits 117. Switching network 104 includes link 104A, which contains the circuit paths required to interconnect the circuits having left side network appearances with those having right side appearances. The network 104 further includes network controller 104B, which controls the operation of the link in its path-establishing function.

Each TSPS trunk circuit 103– is connected by means of two separate conductor pairs to two separate link appearances on the left side of link 104A. Conductor pair T and R connects the incoming side of the trunk circuit to the link. The T1 and R1 conductor pair connects the outgoing end of the trunk circuits to the left side of the link.

Digit receivers 107 receive call information outpulsed from the local offices or circuits that extend calls to the TSPS center. Outpulser 106 transmits to the next office the information it requires on each call extended to it from the TSPS center.

The TSPS center furnished various call types of service on each call extended to it. This service may include the recording of call charge data by recorder 137 and, with special interest with respect to our invention, it may include the attachment of an operator position 109– to the calling TSPS trunk circuit, via the link if operator assistance is required for any reason.

The operator position is disconnected from the call when the required assistance has been furnished. The calling and called stations remain connected via the TSPS trunk circuit for the call duration. The system monitors and times the call and, upon its termination, causes recorder 137 to perform a charge data recording operation.

Each operator position contains a plurality of keys which may be selectively depressed to generate call information when the position is temporarily bridged onto a call connection by means of network 104. In addition to the signals received from the operator positions, the system receives supervisory signals from the trunk circuits 103, and it further receives internally generated signals indicating the current state of the various elements of the system. All of these signals are used by the system in its call serving activities.

On many calls operator assistance is required only momentarily and briefly in connection with the call establishment. Examples of such calls are those of the customer dialed person-to-person and collect type. The operator services are required only for a few second on such calls and once it has been determined that the specified party is available at the called station, or that the called station will accept the charges, the operator releases her position and no further assistance is required of her for the remainder of the call. Certain calls, such as those of the time and charge type require the continuous attention of the operator so that she may notify the calling party of the call charges upon its termination. Calls of this type are served by placing them in what is known as a hold state at the operator position. Once the operator has performed the initial services required of her and a call placed in a held state, she is free to serve other calls. However, her position contains supervisory lamps and keys for each call so that she may follow the progress of the held call and perform the additional services required of her upon its termination.

In the system of FIGS. 1A and 1B, the link connection between a calling trunk circuit and an operator position is released when the operator puts the call on hold. Prior to releasing the connection, appropriate information is registered in memory 130B to indicate the position that served the call and to which it should be reconnected when the call terminates or when it is otherwise removed from its hold status. Each operator position contains a plurality of keys and by the depression of the appropriate key the operator may remove any call from hold to communicate with either party involved. The depression of this key causes the system to establish a new link connection between the calling trunk circuit and the operator position to which the call was originally connected. On a call of the time and charge type, the operator ascertains the applicable call charges, communicates this information to the calling party, and then releases from the connection.

The circuits that control or assist in controlling the TSPS system include stored program control 130, hereinafter referred to as "SPC," communications bus translator (CBT) 131, central pulse distributor (CPD) 132, signal distributor 133, trunk scanners 134, master scanners 136, group gate 135, and position signal distributor 140. The system of the invention shown on FIG. 1 comprises an electronic stored program controlled system which utilizes many circuits similar to those shown in detail in the copending application to A. H. Doblmaier et al., Ser. No. 334,875, filed Dec. 31, 1963, now U.S. Pat. No. 3,570,008. Dobmaier et al. discloses an electronic-type local office which is controlled in its operation by a real time stored program processor. The Doblmaier et al. system is also disclosed in detail in the entirety of the Sept. 1964 issue of the Bell System Technical Journal.

The SPC may be considered to be the "BRAIN" or basic controlling mechanism for the entire TSPS center. It comprises a stored program real time machine having a processor 130A and a memory 130B. The processor performs arithmetical and logical operations on the data it receives from the memory, as well as on the data it receives from circuits external to the SPC, such as for example, from the scanners. As described in Doblmaier et al., as well as in Jaeger et al., the SPC receives signals from its memory and from the scanners, performs arithmetical and logical operations in response to the received signals, and generates output commands which are transmitted to other circuits to control them in the performance of their required call functions. The circuits which respond to the SPC output commands are referred to as "-peripheral circuits" since they are peripheral, or external, to the SPC.

The SPC communicates with the peripheral circuits by means of communication paths referred to in this specification as "busses." The busses which transmit the SPC commands to the various peripheral circuits are the 1-out-of-N address bus 139 and the binary address bus 138. The SPC transmits its output commands in binary form directly to the CBT over paths 147 and 148. The CBT applies the binary information to the binary address bus system. The CBT also translates the SPC binary output into a plurality of 1-out-of-N information bits and applies these to the 1-out-of-N address bus system. Thus, for each binary command received, the CBT applies a corresponding binary command to the binary address bus and, in turn, to the peripheral circuits served by this bus. Simultaneously, a 1-out-of-N-type command is applied to the 1-out-of-N address bus and to the peripheral circuits it serves.

The function of the trunk scanner is to monitor the current state of each trunk circuit and, upon command, report its findings to the SPC. The trunk scanner is connected to a plurality of circuit points within each trunk circuit, and each such circuit point it, in turn, individually connected to a different sensing device, termed a "ferrod" in the scanner. Each ferrod has a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing state of each circuit. The master scanners are similar to the trunk circuit scanners except that they monitor the operational states of circuits other than trunk circuits. These include the service circuits, the digit receivers, and the coin tone receivers connected to the right side of the position link. Ferrods are further described, inter alia, in the Baldwin-May U.S. Pat. No. 3,175,042 of Mar. 23, 1965.

The scanner ferrods are arranged into rows of 16 ferrods each. Each command received by a scanner specifies a ferrod row that is to be interrogated. The information resulting from the interrogation is transmitted to the SPC over bus system 140, designated "scanner answer bus." With this arrangement, the transmission of a command to a scanner instructing it to interrogate a particular row of ferrods, causes information to be transmitted back to the SPC signifying the current state of all circuit points within the system to which the plurality of ferrods in the interrogated row are connected.

The signal distributor 133 comprises a translator whose function is to receive the microsecond-type signals from the CPD and the 1/N address bus and, in turn, transform them into signals having the persistance required to operate and release magnetic latching relays and the circuits which utilize relays. These relays are primarily contained in the trunk circuits and in the service circuits. Signal distributors are further described in the aforementioned issue of the Bell System Technical Journal, as well as in the Jaeger-Joel aforementioned patent.

The switching network 104 operates in response to the reception of the coincidentally received signals from the CPD and the 1/N address bus system. These commands cause them to establish link connections between their left side and right side appearances. The paths by which these connections are to be established are not determined by the links but, instead, by the SPC in response to the information it receives from its memory. Switching networks of the type suitable for use with the present invention are disclosed in detail in the aforementioned issue of the Bell System Technical Journal, as well as in the patents cited in the aforementioned Jaeger-Joel patent.

The function of group gate 135 is to control the operation of the position signal distributor 140 in response to commands received from the binary address bus 138. These commands represent lamp information that is to be transmitted to a particular operator position to assist the operator in serving a call currently at her position. The position signal distributor is similar to the signal distributor 133 in that it comprises a translator which receives the group gate output signals and translates them into signals having the persistence required to operate or release magnetic latching relays in the position buffer circuits 208–. Each position buffer circuit contains the relays required to control the lamp displays at its associated operator position.

Position scanner 142 transmits key signal information from the positions via the master scanner to the SPC. Each position circuit contains a plurality of keys which may be depressed by an operator to generate call information or service requests. This information may comprise numerical data, such as calling and called numbers; it may comprise call charge data signifying the type of service requested by the calling party; and it may also comprise call status information, such as for example, signals requesting the disconnection of the operator position from the call. Position scanner 142 is connected to each key in each position and, by virtue of these interconnections, it continually monitors the state of each key. In response to the depression of any key at any position, it transmits signals back to the SPC, via the master scanner, signifying the key that is depressed as well as the position in which the key is located. The position scanner is shown in detail in the aforementioned Jaeger-Joel patent, as well as in the G. Riddell application, Ser. No. 537,224, filed Mar. 24, 1966, now U.S. Pat. No. 3,529,090.

The SPC performs its function of controlling the system operation on each call in response to the signals it receives from the various scanners. From the trunk scanners 134, the SPC receives information including supervisory signals indicating the on- or off-hook status of the calling and called stations. From the master scanner 136, the SPC receives the operator key action signal information as well as information regarding the status of many circuits of the system including the link, the service circuits, outpulsers and digit receivers. The SPC also uses signals that are internally generated by it as it operates under control of its memory as well as to the signals received from the scanners. The SPC receives signals from these various sources, and utilizes them to perform its required function of controlling the call serving activities of the system in an ordered manner.

GENERAL DESCRIPTION—STORED PROGRAM CONTROLLER (SPC)—FIGS. 2 AND 3

The SPC, shown as element 130 on FIG. 1A, is a stored program machine having a processor 130A and a memory 130B. The memory stores both program instructions and data. All instructions, and some data, are stored on a relatively permanent basis and are changed only infrequently. Other of the data is relatively temporary in nature, and it may be entered into memory, modified and erased during the serving of a call. The program instructions provide the intelligence necessary to instruct the processor in the many functions required of it under any of the many call situations it may encounter. The processor monitors and controls peripheral equipment by performing logical and/or arithmetic operations on data temporarily stored in registers within it, under control of the programmed instructions, and by transmitting to the peripheral equipment output information or commands generated while performing these operations. Although the processor may perform many different functions, it is capable of executing only one instruction at a time under control of the memory.

The SPC either directly or indirectly controls the operation of every circuit in the system. All commands specifying an operation in another circuit originate within the SPC and all answers signifying the existing operational state of many circuit points within the system are returned to the SPC. Certain instructions result in actions which are entirely confined within the SPC. For example, an instruction or series of instructions may command the SPC to perform logical and/or arithmetic operations on the data currently contained within it. Other instructions may cause the SPC to command a peripheral circuit to perform an operation which results in an answer being sent to the scanner to read or interrogate a specific row of ferrods. The results of the interrogation is transmitted over the scanner answer bus back to the SPC, where the information is stored temporarily either in memory or in index registers within the processor until it can be later utilized.

The SPC communicates primarily with the CBT's (communication bus translators), the CPD's (central pulse distributors), and the scanners. The output signals of the SPC are commonly referred to as "commands" since they cause the circuit receiving them to perform the operation specified by the command. The commands transmitted to the CBT's are applied over circuit paths 147 and 148 and they instruct the CBT's to apply their own output commands to the address buses which, in turn, transmit them to the peripheral circuits to which they are connected. The SPC output commands are received by the CPD's over circuit paths 110 and 112 and they instruct the CPD's to unlock the receiving portion of a specified peripheral circuit in order that it, and only it, may receive and register the command currently on the address bus to which the specified peripheral circuit is connected.

The scanner answer signals are transmitted over the scanner answer signals bus 140 back to the SPC. The information represented by these signals signifies the current state of many circuit points within the system. Each such circuit point is associated with an individual ferrod in the scanner and the plurality of ferrods within a scanner are divided into rows. When the SPC desires to obtain information regarding the state of a specified circuit point, it causes commands to be transmitted to the scanner, which instructs it to scan the ferrod row containing the ferrod individual to the specified circuit point. The scanner answer transmitted to the SPC as the result of this interrogation represents the existing state of the specified circuit point as well as all of the other circuit points individual to the remainder of the ferrods in the interrogated ferrod row.

Figure 2:
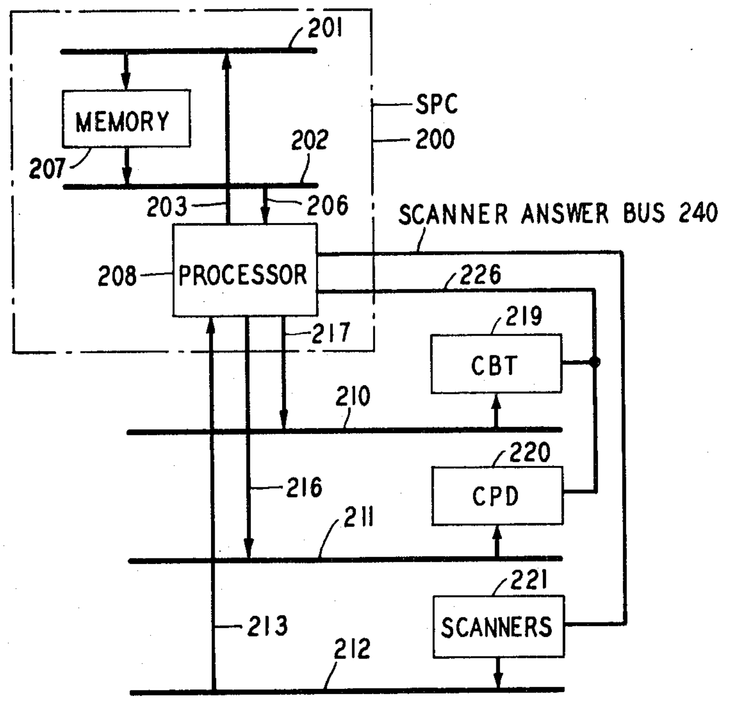
FIGS. 2 and 3 diagrammatically disclose a stored program controller including a processor that may ideally be used in embodying our invention.

FIG. 2 discloses in greater detail the relationship between an SPC 200 and the circuits with which it communicates. The processor 208 retrieves either data or instructions from memory 207 by a read operation and it enters information into memory by means of a write operation. The input bus for memory 207 is element 201; the output bus is element 202. FIG. 2 also discloses CBT 219, CPD 220, and a plurality of scanners which are represented generally as element 221. The processor transmits commands to the CBT over bus 210 and to the CPD over 211. It receives information from the scanners over bus 240 and from the CBT and CPD over bus 226.

Figure 3:
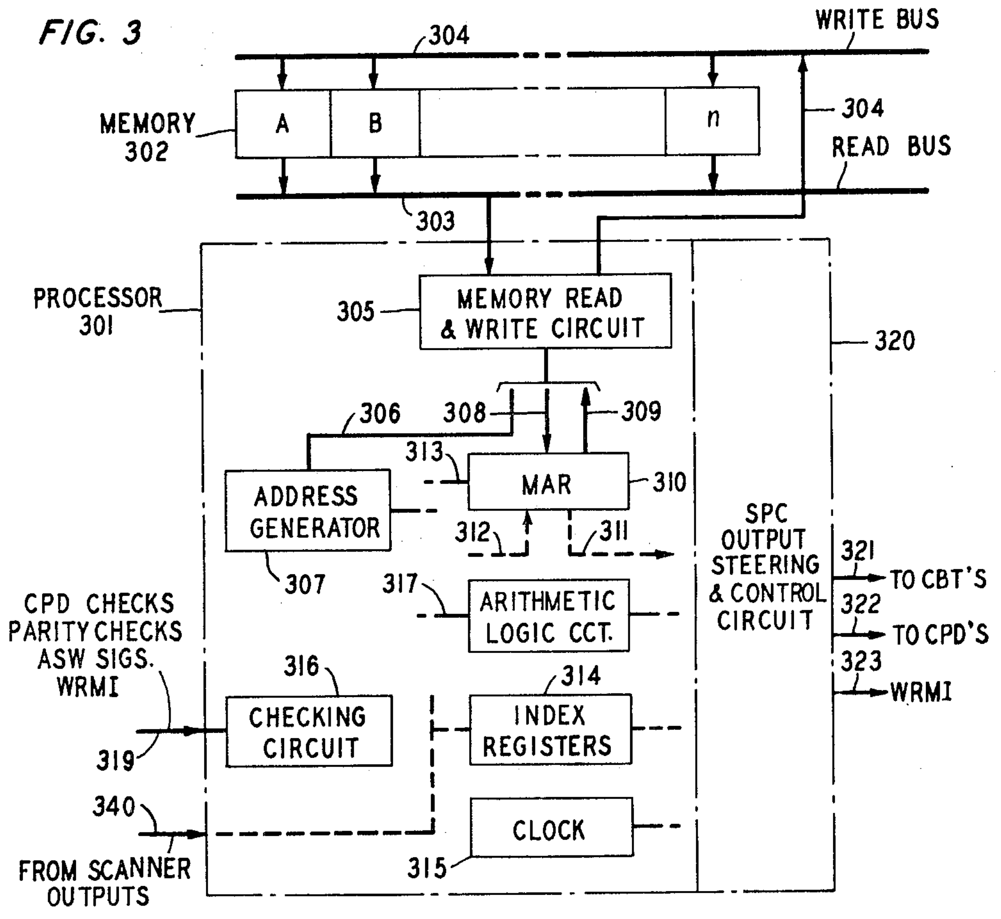

Additional details of the SPC are shown on FIG. 3. This figure discloses a processor 301, a memory 302, the circuit paths interconnecting these two elements, as well as the circuit paths interconnecting the processor with circuits external to the SPC.

Memory 302 is functionally subdivided into a plurality of portions designated A, B...*n*, each of which stores the program and data required to enable the SPC to perform the many separate functions required for the operation of the system. The Memory Read and Write Control Circuit 305 within the processor controls the operations required to read data and instructions out of and enter data into memory. The information to be written into memory is applied to it over bus 304 from the output of circuit 305. Similarly, the information that is read from memory is applied by means of bus 303 to circuit 305. Each portion of memory is represented by an address, as is typical in stored program machines, and therefore in performing each read and write function, circuit 305 obtains the address of the pertinent portion of memory from address generator 307 over path 306. The memory access register MAR 310 transmits to circuit 305 the information that is to be entered into memory on write operations, and on read operations it receives from circuit 305 the information extracted from memory. The information the MAR 305 receives from memory on a read operation is transmitted to other elements (not shown) within the processor over path 311. Similarly, the MAR receives from these other elements the data that is to be entered into memory on a write operation over path 312.

Since the details of the processor comprise no part of the invention, many of the elements with which the MAR communicates are shown only diagrammatically. However, included in the processor is the circuitry required to operate upon and manipulate the data stored within it so that both logical and arithmetic operations may be performed. This circuit is represented generally by the box entitled Arithmetic and Logic Circuit and shown as element 317.

The index registers 314 cooperate with circuit 317 to perform arithmetic and logical operations upon the data received by the processor both from memory and from circuits external to the SPC. The index register are also used to receive and register temporarily the scanner answer information. This information is received over path 340 and when received, it is stored within the index registers until it may be acted upon and then either entered into memory, utilized for other purposes, or discarded. Checking circuit 316 receives the various check signals, parity signals, et cetera, which must be received by the SPC in response to the various commands it transmits to other circuits before it proceeds with another command. The output commands generated by the SPC are applied to external circuits by the circuit entitled "SPC Output Steering and Control Circuit" and designated as element 320. Cable 321 transmits commands from the SPC to the CBT; cable 322 transmits commands from the SPC to the CPD; and cable 323 transmits WRMI pulses to the circuits requiring them.

The SPC is shown primarily in diagrammatic form since its detail comprises no portion of the present invention and since stored program controllers suitable for use in our invention are disclosed elsewhere. For example, the aforementioned Doblmaier et al. application discloses in complete detail a stored program controller which may be utilized to generate the control signals required to operate the circuits of our invention. The Doblmaier et al. stored program controller is further described in complete detail in the aforementioned Bell System Technical Journal of Sept. 1964, which issue is devoted in its entirety to an electronic switching system and with approximately 50 percent or more of this issue being devoted to details of the stored program controller. Also, if desired, a stored program controller whose processor is shown in the Kettley et al. U.S. Pat. 3,370,274 of Feb. 20, 1968, may be utilized.

The processor receives the call signals and information with which our invention is concerned from the scanners and from memory. The scanner information is received over path 340 and is ultimately entered into one of the index registers. This scanner information may represent supervisory signals, it may represent information from one of the peripheral circuits to which the scanner is connected such as, for example, an outpulser or a digit receiver, and it may also represent the key action signals generated at the operator positions.

The signals the processor receives from memory may represent information indicating the current state or change of state of the various calls served by the system. This information is normally generated by the processor and the memory, together in response to the change of state and other type signals the processor receives from the scanner. Thus, the processor may receive a supervisory change of state signal from the scanner and, in response to the receipt of this signal, it will cooperate with the memory to determine that the change of state represents an on-hook signal indicating that the calling party has abandoned the call and that the forward connection should be released. Similarly, the processor may receive a relatively simple type of operator key signal requesting a release of the forward connection to which the operator is connected. In response to the receipt of this signal, the processor and the memory will together determine whether the connection may be released immediately. If it can, the processor and the memory together will generate the necessary signals that are required for transmission to the peripheral circuits to cause the release of the connection.

The illustration of the processor on FIGS. 2 and 3 is diagrammatic and general in nature since our invention is not concerned with its specific details, but rather, relates to the manner in which the processor, the memory, and the remainder of the elements of the system of FIGS. 1A and 1B all cooperate to effect the call transfer operations provided in accordance with our invention.

DETAILED DESCRIPTION

Figure 4:
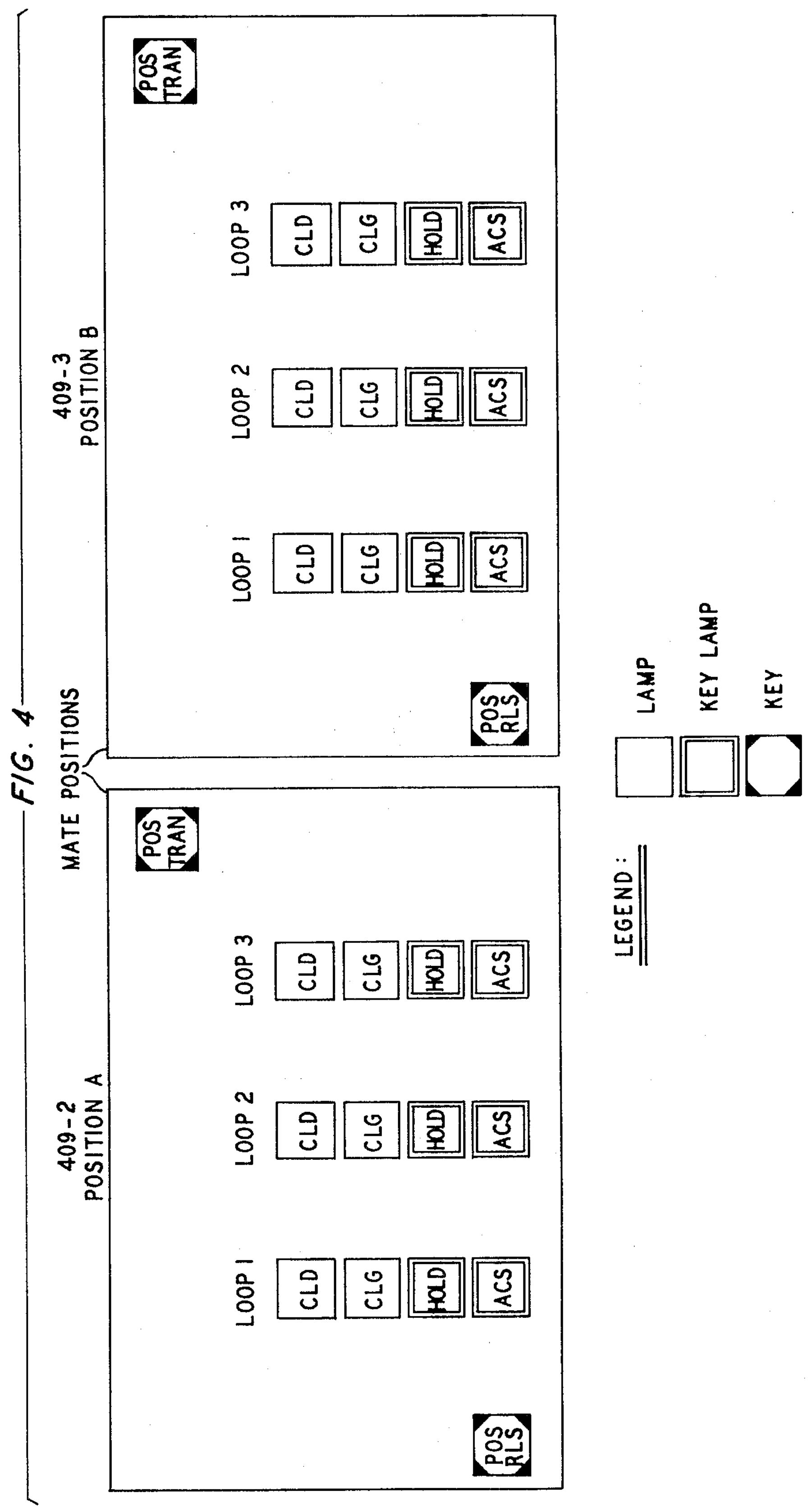
FIGS. 4 through 8 disclose the details of our invention.

FIG. 4, together with FIG. 2, illustrates further details of how the calls are served at operator positions and how they are transferred between positions in accordance with our invention. The operator positions are arranged into pairs with each pair of positions comprising what is known as a position console. The two positions comprising a console are adjacent in close proximity to each other, while the different position consoles are arranged in a spaced-apart relationship. In short, the two operators that occupy the two positions of a single console are closer to each other than they are to operators of the other position consoles.

With respect to FIG. 1B, positions 109–2 and 109–3 may be assumed to be a single position console. The remaining positions are similarly arranged into pairs with each pair comprising a console.

FIG. 4 discloses further details of a typical position console. It shows the facilities used for serving calls at each position and for transferring calls between positions. In particular, FIG. 4 discloses the position lamps and the keys that are used in serving calls of the type to which our invention pertains. In actual practice, each position contains other keys and other lamps. However, these are not shown on FIG. 4 since their function does not relate to an understanding of our invention.

On FIG. 4 the two positions comprising the illustrated console are designated 409–2 and 409–3. These two positions will hereinafter be referred to as position A and position B, respectively. Each position contains a position transfer key, a plurality of lamps and a plurality of key lamps with each of these elements being represented by the symbol or legend shown on the lower portion of FIG. 4. The mechanical details and the general function of the keys and the lamps require no further explanation. Each key lamp serves the combined function of a key and a lamp. Each contains a lamp that may be energized to display information and each may be depressed in the same manner as a key to generate information. The provision of the key lamps is merely a preferred mechanical feature since it eliminates the necessity of the separate keys and lamps that would otherwise be required.

The position transfer key is shown in the upper right hand corner of each position and the depression of this key is effective to transfer any held calls from a mate position to the position at which the key is depressed.

Certain ones of the lamps and key lamps at each position are subdivided into three groups which are designated Loop 1, Loop 2 and Loop 3, respectively. The lamps and key lamps of each loop permit an operator to serve a call, place it on hold, and then serve another call while the earlier received call remains on hold. The following better describes the manner in which a call is served at a position under typical conditions.

Let it be assumed that the trunk 103–1 receives a call, and that the controlling elements of the system including the processor and its memory determines that this call should be served by a position A shown as element 109–2 on FIG. 1B. In this case, link 104 establishes a connection between the T and R conductors of trunk 103–1 and conductors 110–2 extending to position 109–2. Each loop at a position contains or is associated with facilities for enabling an operator to serve a call directed to the position. Thus, at the same time the processor determines which position is to serve a call, it also determines which loop of the selected position should receive the call. If all three loops of the position are idle, the selection is made on a sequential basis. On the other hand, if one or two of the loops currently contain held calls, the selection of the loop for a new call is limited to the idle loops. Let it be initially assumed that position A is to serve the call and that the call is offered to Loop 1 of this position. This being the case, the processor causes the access (ACS) key lamp and the called (CLD) lamp at Loop 1 of the position to light as an indication to the operator that a call has been extended to her position. The calling (CLG) and called (CLD) lamps of each loop indicate the supervisory status of the calling and called parties, respectively, for a call served by the loop. These lamps are darkened when their respective parties are off-hook and conversely are illuminated when their respective parties are on-hook. A call is typically offered to an operator position before the called party has answered. This being the case, the CLG lamp will be illuminated and the CLD lamp will be lighted when the position initially receives the call. The network path between the calling trunk and the position is established at the same time the ACS lamp is lit and therefore the operator may immediately converse with the calling party to determine the service he requires. Let it be assumed that the caller desires to be notified of the applicable charges at the end of the call. In this case and assuming that the call was of the customer dialled type, the operator depresses the HOLD key lamp of Loop 1 and the POS RLS key to place the call on hold. No other services are required of her on this call for the time being, and by means of the CLG and CLD lamps of Loop 1 she may monitor the on-hook and off-hook status of the both parties. The CLD lamp will be extinguished as soon as the called party answers and both the CLD and the CLG lamps will remain dark until one party hangs up or until either party flashes his switchhooks.

The controlling elements of the system, including the processor, detect the depression of the HOLD key lamp and POS RLS key and in response thereto they break down the link connection between the calling trunk circuit and operator position A. The operator can continue to monitor the status of the call by means of the CLD and CLG lamps and she is free to receive other calls on either the Loop 2 or Loop 3 facilities of her position. Conversely, she could not at this time receive another call on Loop 1 since it is currently involved in monitoring the status of the held call.

Let it be assumed that position A now receives a new call on its Loop 2. The receipt of this call is indicated by the illumination of the ACS and CLD lamps for Loop 2. Let it further be assumed that that call is of the person-to-person customer dialed type. The only function of the operator on this call is to wait until the called station answers and to determine that the specified party is on the line. After making this determination she depresses a class of charge key (not shown) at her position to indicate the call type and then depresses the position release (POS RLS) key to release from the call. This releases the link connection between the calling trunk circuit and her position. The majority of calls are served in the manner just described with operator service being provided only momentarily following which the position is released to make it available for serving other calls.

It may be seen from the foregoing that if a position were never required to serve held calls that only one loop would be required since an operator can actively serve only one call at a time. Therefore the provision of a single loop would be sufficient as long as no hold calls were encountered. However, a plurality of loops are required whenever an operator must monitor one or more hold calls and at the same time remain free to serve other calls that only require her services momentarily. With the facilities provided as shown on FIG. 4 an operator can maintain two calls on hold, observe their status, and still remain free to serve other calls by her third loop. On the other hand, if all three loops are involved with hold calls, the operator can temporarily perform no function other than that of monitoring the state of the held calls by observing the CLD and CLG lamps for each loop.

An operator takes a call off hold by depressing the ACS key lamp for the loop. Its depression causes the system to reestablish a connection between the operator position and the trunk circuit 103– serving the call. An operator typically takes a call off hold either at the call termination or when either customer flashes his switchhook. A hang up at the end of the call or a flashing of the switchhook of either party is detected by observing the CLD and CLG lamps for the loop serving the hold call.

The depression of the position transfer (POS TRANS) key at a position causes the system to transfer all calls on hold at the mate position to the position in which the transfer key is depressed. This feature is desirable in order that an operator having one or more calls on hold at her position may go off duty and abandon her position without being required to wait for all hold calls at her position to terminate.

Let it be assumed for example that position A has held calls on its Loops 1 and 2, that position B has a call on hold on its Loop 1, and that its Loops 2 and 3 are idle. If the operator position A desires to abandon her position, the operator at position B may depress her POS TRANS key to transfer the held call on Loops 1 and 2 of position A to her position. In accordance with our invention the system performs this transfer operation by determining which loops of position B are not serving held calls and by then effecting the transfer in such a manner that transferred held calls maintain their left to right spatial relationship. In other words, since Loop 1 of position B already has a held call, the held call on Loop 1 of position A is transferred to Loop 2 of position B and the hold call on Loop 2 of position A is transferred to Loop 3 of position B. Immediately following the transfer, the lamps at position A are no longer illuminated, and the appropriate lamps on Loops 2 and 3 of position B are illuminated to permit the operator at that position to monitor the transferred held calls.

As is subsequently described and in accordance with our invention, facilities are provided for checking that position B has enough idle loops to accommodate the held calls at position A before the transfer is made. If this condition is not met, the transfer is not made and the transfer request will be ignored until the key is subsequently depressed at a time when enough facilities are available at position B to serve all of the hold calls that require transfer from position A. Position A can be vacated, however, and the calls will remain there until such time as position B can effect the transfer.

It has already been mentioned that the link connection between a calling trunk circuit and the position serving the call is released when the position places the call on hold. At this time and for the remainder of the hold portion of the call, the system memory registers various items of information concerning various aspects of the call. This information includes the trunk circuit serving the call, the position that served the call, the number of the loop that received the call, the current on-hook or off-hook status of each party, the chargeable time, et cetera. This information enables the system to reconnect the calling trunk circuit with the proper position when the held state of the call is terminated. This mode of serving held calls is further advantageous since, in accordance with our invention, it permits calls to be transferred between positions not only when one of the positions is to be abandoned but also when one of the positions suddenly becomes inoperative because of a hardware failure of one of its components. This permits a held call associated with an inoperative position to continue to be served rather than aborted. In operator assistance type systems in which a held call remains connected to the operator position that initially received the call, no facilities are available for serving the call in the event that its associated position becomes inoperative. It is necessary in such systems to terminate or abort the calls associated with inoperative positions. Conversely, in the system provided in accordance with our invention there is no physical connection between a call on hold and any operator position. Rather, the call is only functionally associated with the operator position that originally served it with this association being represented by information stored in memory. Therefore, if the system determines that a position becomes inoperative, it may write new information in memory to transfer the association of the call from the inoperative to an operative position. By this expedient the call can continue to be served, the system will continue to update the status of the call in memory, the progress of the call can be followed by the new position with which the call is associated, and upon the termination of the held state of the call, the calling trunk circuit is interconnected via the link with the new position.

In accordance with this feature of our invention an operator at position B may be advised that position A has suddenly become inoperative and that it is currently serving a hold call on its Loops 1 and 2. Provided that the necessary idle loops are available at position B, its operator may depress her POS TRANS key to transfer the held calls on Loops 1 and 2 of position A to the idle loops of her position in the same manner as already described.

Figure 5:
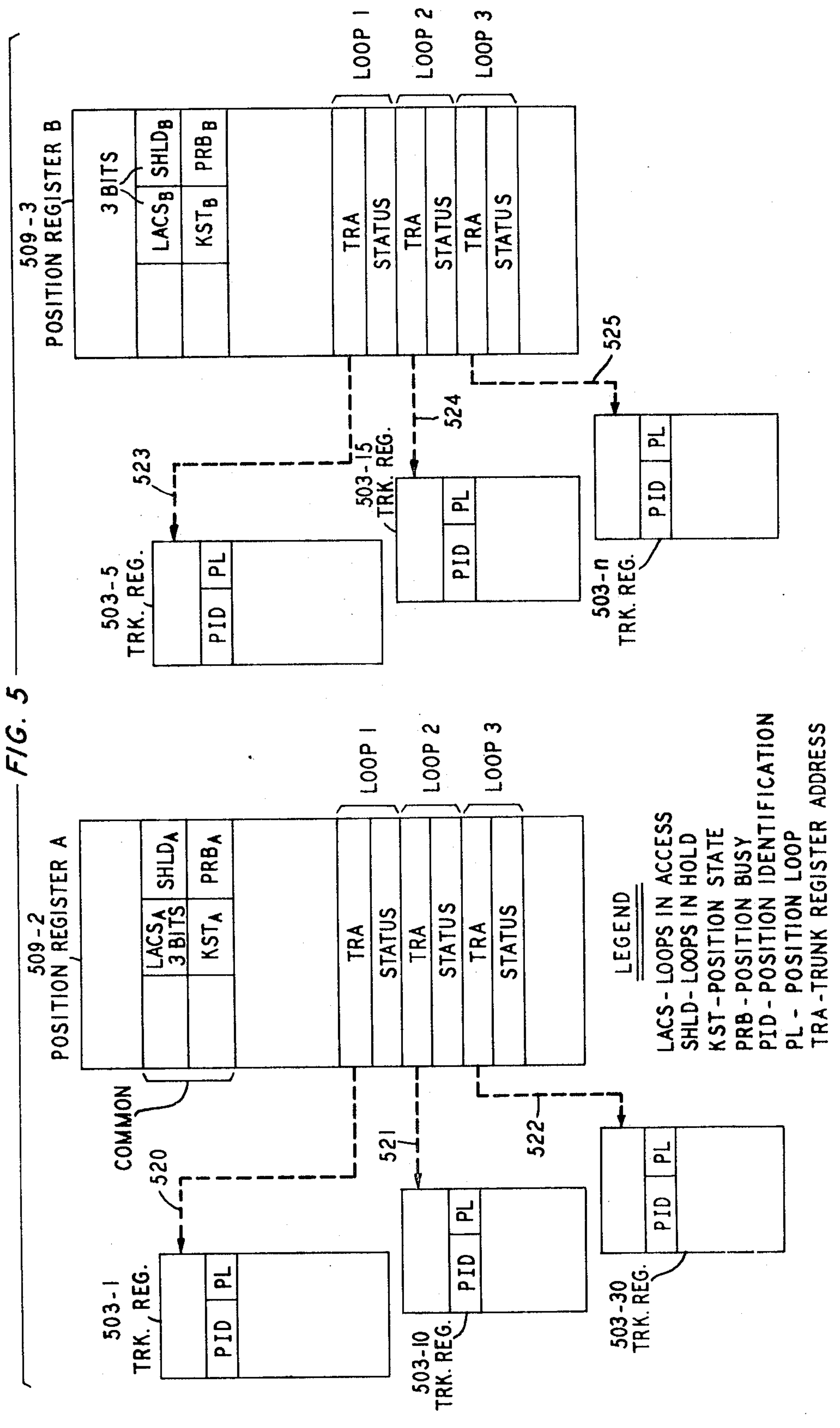
Figure 6A:
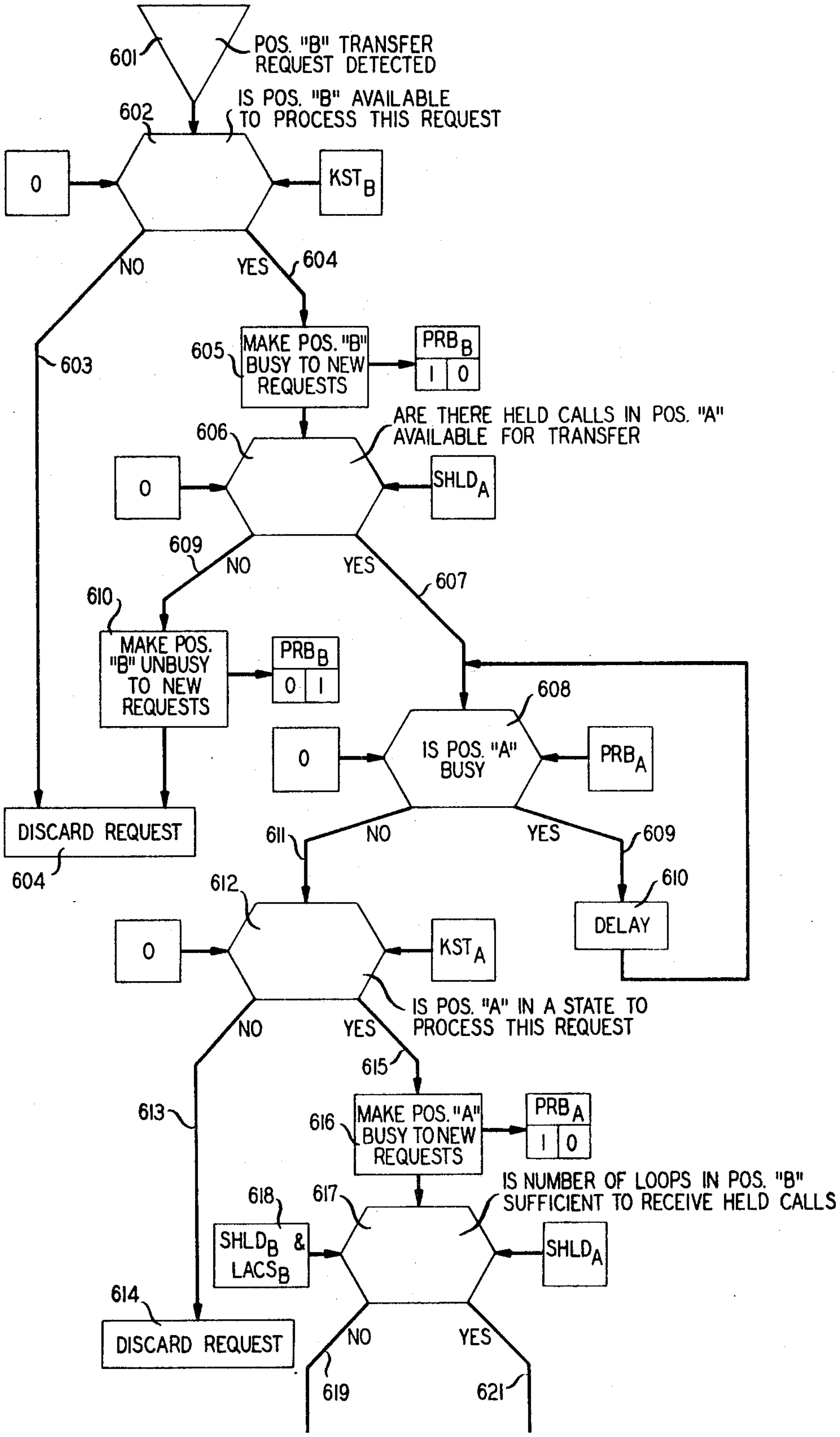
Figure 6B:
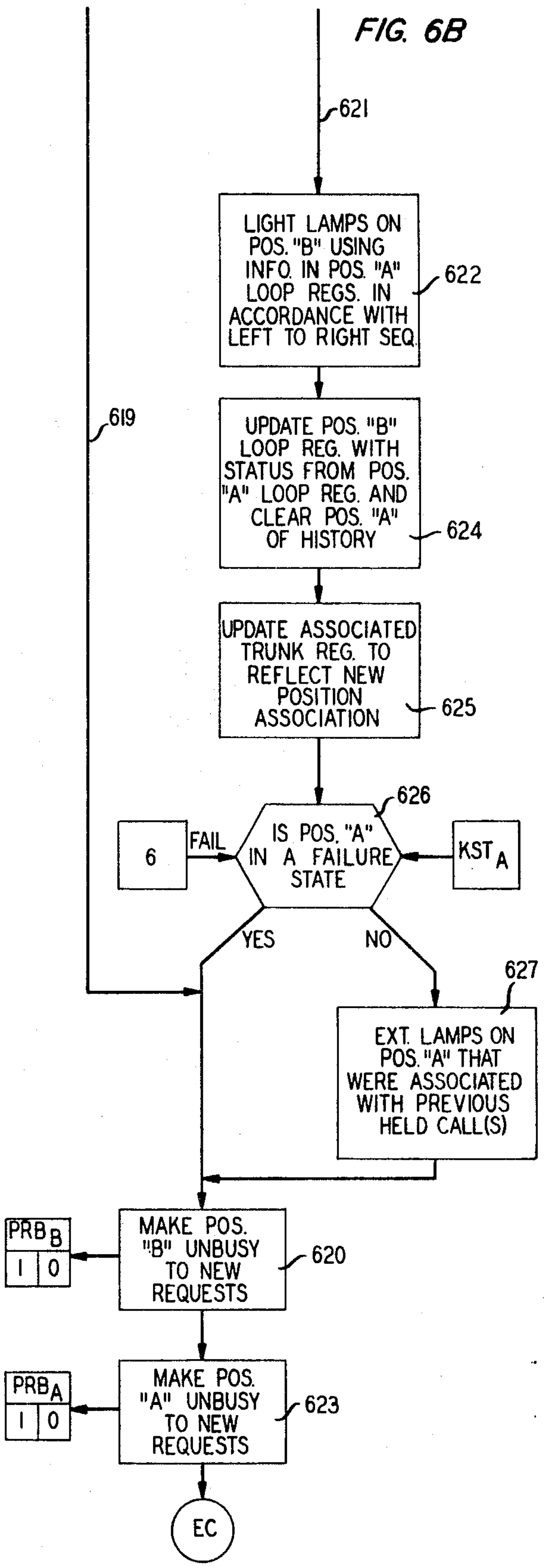
Figure 6C:
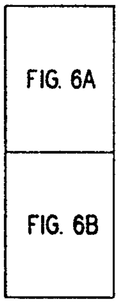

FIG. 5 illustrates the register facilities in which the processor stores call information including information indicating the association of a trunk circuit and a position so that a call on hold may be reconnected to the proper position.

The register facilities associated with the trunk circuits comprise a plurality of trunk registers of which there is one individual to each trunk circuit of FIG. 1A. Only six such registers are shown on FIG. 5 and these are arbitrarily designated as 503–1, –10, –30, –5, –15, and –*n*. Each such register is individual to the trunk circuit on FIG. 1A having the corresponding suffix. In other words, trunk register 503–1 is individual to trunk circuit 103–1. Only six such trunk registers are shown on FIG. 5 and the six that are shown were selected at random for purposes of explanation.

The register facilities include a plurality of position registers of which there is one individual to each operator position of FIG. 1B. Only two such registers are shown on FIG. 5 with position register 509–2 being individual to operator position 109–2 on FIG. 1B and with position register 509–3 being individual to position 109–3.

The trunk registers and the position registers are functionally divided on FIG. 5 to indicate the nature of the call information stored in each. The nature of this information is indicated by symbols and legends whose meaning is explained on the lower portion of FIG. 5 under the column designated "Legend."

The trunk and position registers are not associated with each other except when their related facilities are serving the same call. The dotted lines interconnecting the various position registers with the different trunk registers illustrate the status of the system at the time that position A is associated with three calls served by trunks 103–1, –10, and –30, respectively, while position register B is associated with the trunk circuits 103–, –5, –15, and –*n*, respectively. The dashed line 520 indicates the current relationship between position register A (509–2) and trunk register 503–1, the other dashed lines indicate the relationship between position register A and trunk registers –10 and –30 as well as the relationship between position registers B (509–3) and the indicated trunk registers.

Each position register stores certain information that is common to the position. The meaning and significance of this common information is described subsequently in detail. Each register also stores information individual to each of its three loops. Two such lines of information individual to each loop are shown with the top line for each loop being designated TRA and the bottom line being designated STATUS. As indicated by the legend chart, the TRA segment for a loop stores the memory address of the trunk register individual to the trunk circuit currently connected to or associated with the position loop. With reference to position 509–2, the TRA line of its Loop 1 currently stores the address of trunk register 503–1 since it is assumed by virtue of the dashed line 520 that trunk circuit 1 is either currently connected to Loop 1 of the position A or, alternatively, is serving a hold call that was initially extended to Loop 1 of position A. The STATUS line of Loop 1 stores miscellaneous information pertaining to the call such as the on-hook off-hook status of the parties, lamp display information, et cetera.

Each trunk register stores a plurality of information of which two are significant with respect to our invention. The first is PID information which identifies the position to which the call now served by its trunk circuit was initially extended or is currently connected. The PL segment identifies the position loop that received the call. Thus, with respect to trunk register 503–1, its PID segment stores the identification of position register 509–2 and its PL segment indicates that Loop 1 of this position received the call currently being served by trunk circuit 1.

Loops 2 and 3 of position register A, and all loops of position register B, stores information analogous to that just described for Loop 1 of register A at the time these other loops are connected to or associated with calls.

Segment LACS (loop in access) of each position register stores information indicating the idle or busy state of each of the three loops at the position. The term "loop in access" means that a loop is busy serving an incoming call. A loop is not in access if it is serving a held call or if it is idle and not actively serving a call. Segment SHLD stores information indicating which of its loops that are currently serving calls on hold. Segment PRB stores one binary bit indicating whether or not the processor is currently performing work for a call being served by the position. Segment $KST_A$ stores a multibit word that represents various possible system states for a call being served by the position. The meaning and significance of a KST and PRB information is subsequently described in further detail.

FIGS. 6A, 6B, 7 and 8 illustrate the manner in which our invention controls the transfer of held calls between positions. Let it be assumed for purposes of this description that position A currently has a call on hold on its Loop 1; that the operator at position A has abandoned the position, and that the operator at position B depresses her key POS TRANS key to request the transfer of the held call on Loop 1 of position A to the first idle loop of her position. In this connection let it further be assumed that Loop 1 of position B also has a held call but that Loops 2 and 3 are currently idle.

The depression of the POS TRANS key at position B generates a signal that is ultimately received by the processor. The manner in which these signals are generated and transmitted to the processor are described in further detail in the aforementioned Jaeger-Joel U.S. Pat. No. 3,484,560, and G. Riddell application, Ser. No. 537,224, filed Mar. 24, 1966. Element 601 comprises that portion of the processor and its memory which receives this signal and determines its significance; namely, that it is a request for a call transfer operation between positions A and B. In response to this determination, element 601 transmits a signal to decision making element 602 which determines whether the call transfer request can be honored at this time. Element 602 on its left side is connected to a source that continuously stores the digit "0" while its right side is connected to the $KST_B$ segment of position register B. This segment stores information indicating the current state of any work requests priorly initiated by the operator at position B. Generally speaking, there are certain call states which indicate that the processor has not yet completed all priorly requested work functions for a call and therefore it cannot currently respond to any new work request such as, for example, a position transfer. Any call states which would preclude the processor from currently responding to the position transfer request are assigned a digit value other than "0." In such a case, the element 602 does not detect a comparison between the "0" on its left side and a "0" in $KST_B$. Therefore, it then would transmit a signal over path 603 to element 604 indicating that the position transfer request should be discarded.

Element $KST_B$ contains a "0" whenever the processor is in a state in which it can respond to additional work requests generated at position B. At such times element 602 detects a comparison and transmits a signal over path 604 to element 605 which causes the processor to make position B busy to any new requests. As a first step in this regard, element 605 transmits a signal to the PRB section of the position register B to indicate that the processor is actively attempting to complete a work request for position B namely the request position transfer action. Element 605 further transmits a signal to comparison element 606 which determines whether or not there are any held calls currently at position A. It makes this determination by comparing the "0" on its left side with its $SHLD_A$ section of position register A. This segment of the position register comprises a three bit word which is set to "0" whenever there are no calls on hold and which is set to "1" in the appropriate bit whenever the loop corresponding to the bit is on hold. If element $S^A$ of the position register is set to "0," element 606 would detect a comparison and transmit a signal over its NO path 609 to element 610. This element sets the PRB bit to "0" for position B and in turn transmits a signal to element 604 indicating that the position transfer request should be disregarded. The resetting of the $PRB_B$ segment of the position register B to "0" indicates that work requests may now be received from the same position since its position transfer request regarding position A cannot be honored.

Since position A is assumed to have a hold call on its Loop 1 at this time, the corresponding binary bit in $SHLD_A$ now contains a binary "1." Element 606 therefore receives a "1" on its right-hand side and a "0" on its left-hand side. It does not detect a comparison, and it transmits a signal over YES path 607 to decision element 608 which determines whether the processor is currently able to perform a work request involving position A. If the system is not able to serve another request at this time for position A, the $PRB_A$ information is set to "1," elements 608 do not detect a comparison and it transmits a signal over its YES path 609 to delay element 610 which, after an appropriate delay, reapplies the request signal to the upper input of element 608 where the process is repeated to test the state of position A.

If the system is in a condition to do further work for position A, the $PRB_A$ bit is set to "0," element 608 detects a comparison and transmits a signal over its NO path 611 to element 612 which analyzes the $KST_A$ element of position register A to determine whether this transfer request can be currently honored. Element $KST_A$ is set to "0" whenever a transfer request can be honored. It is set to a value other than "0" whenever such a request cannot be honored. In the event the request cannot be honored, the element 612 detects the nonzero state of $KST_A$ and transmits a signal out over its NO path 613 to element 614 where the transfer request is disregarded. If the system is in a condition with respect to position A to effect the call transfer, element 612 detects a comparison on its left and right input signals and transmits a signal over YES path 615 to element 616 which sets the PRB bit for position A to "1" and transmits a signal to element 617. This element determines whether position B contains a sufficient number of idle loops to receive the held calls at position B.

Element $SHLD_A$ is a part of position register A and contains a number representing the number of calls on hold at position A. Element 618 stores a number representing the number of loops that are currently busy at position B, namely the number of loops having calls on hold together with any loop in access. If the facilities available at position B are equal to or greater than the number of calls to be transferred from position A, element 617 applies a signal to element 622 over its YES path 621. If the facilities available at position B are inadequate, element 617 applies a signal to its NO path 619. This NO signal is received by element 620 which sets the PRB bit to "0" for position B, transmits a signal to element 623 to reset PRB bit to "0" for position A, and returns control of the processor to executive control EC. The setting of the PRB bits to "0" for each position permits the processor to honor subsequently received work request from each position.

The signal on path 621 and its reception by element 622 functionally indicates that the requested transfer may take place. Accordingly, element 622 receives the signal and, in turn, lights the lamps on position B to indicate the status of the transferred calls. The lighting of the appropriate lamps at position B is controlled by the STATUS information stored in Loop 1 of position register A as shown on FIG. 5. The STATUS segment of the position register contains a plurality of items of call information and it is this information that at this time controls the lighting of the lamps at position B. With respect to the processor, the lighting of these lamps is accomplished by reading the contents of the STATUS segment of Loop 1, transferring these contents to an appropriate index register of the processor, performing certain logical operations on the information and gating out the appropriate command over the bus system to light the lamps on the appropriate loop of position B. As already mentioned, the transfer of the held calls is accomplished so that their left-to-right orientation is maintained and further so that a transfered call is displayed on the loop of the transferee position that is immediately to the right of the rightmost loop currently in use at the transferee position. In other words, if Loop 1 of position B is in access or is serving a held call, the call transferred from position A is transferred to Loop 2 of position B. Similarly, if Loops 1 and 2 were were busy at position B, the transferred call would be displayed on Loop 3. If Loop 3 at position 3 were busy and Loops 1 and 2 were idle, the transfer call would be displayed at Loop 1.

Element 622 performs its function as already described and transmits a signal to element 624 which causes the processor to transfer the contents of the STATUS segment of Loop 1 of position register A to the STATUS segment of the position register B for the loop that receives the call. It is assumed that Loop 2 of position B receives a call and that therefore the STATUS segment for Loop 2 as shown on FIG. 5 receives the contents of the information transferred from the STATUS segment of the Loop 1 of position register A. The processor also clears the position A status register of all information pertaining to the call that is transferred from it.

Element 624 performs its indicated functions and then transmits a signal to element 625 which causes the processor to write information in the trunk register indicating the identity of the position to which the call has been transferred. In this case, trunk register 503–1 receives this information and in particular its segment PID receives the identification number for position B while its segment PL receives an identification number for Loop 2 at position B.

After performing its functions element 625 transmits a signal to decision element 626 which determines whether position A is currently in a failure state. In this system, a failure state is represented by the digit 6 and the processor enters a 6 in the KST segment of the position A position register whenever the position is in failure. Element 626 receives an input of from $KST_A$ on its right-hand side and receives a 6 on its left side. Thus, if position A is in failure, element 626 detects an identity on both of its inputs and transmits a signal out over its YES conductor to element 620 which resets the PRB bit for position B to "0," transmits a signal to element 623 which resets the PRB bit for position A to "0" and returns control of the processor to executive control. No attempt is made to update the lamps at position A since, being in a failure state, its hardware is inoperate for the time being.

Element 626 does not detect a comparison whenever KST segment of the position register A is not set to 6. This indicates that position A is not in failure. This being the case, element 626 transmits a signal out of its NO path to element 627 which allows the processor to extinguish the lamps on position A that were associated with the held call that is just being transferred from it to position B. Element 627 completes its function and applies a signal to element 620 and in turn 623 to reset the PRB bits to "0" for positions A and B for the reasons already described.

Figure 7:
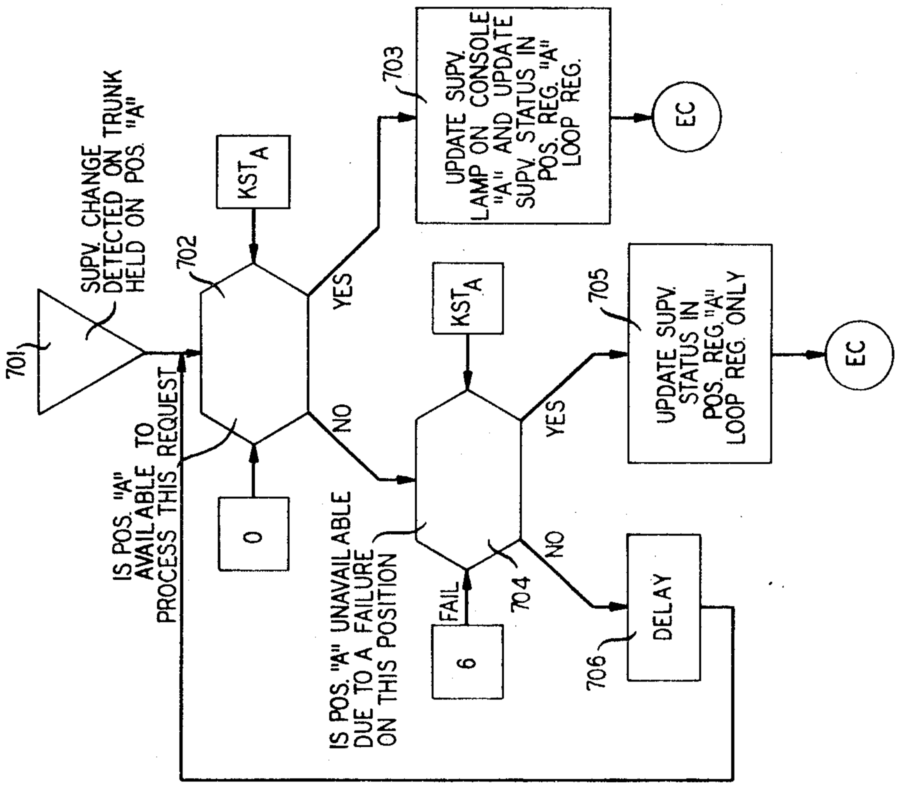

FIG. 7 discloses the operations that take place in accordance with our invention whenever a supervisory change is detected for a held call. The sequence of actions illustrated by FIG. 7 assumes that the held call is served at position A. Element 701 receives the signal representing the supervisory change of state and transmits a signal to comparison element 702 which checks the number currently stored in segment $KST_A$ of the position register A to determine whether or not it is "0." A "0" stored in this segment indicates that the system can currently process this work request while a value in $KST_A$ other than in zero indicates that the system cannot perform the work associated with this request. Thus, element 702 compares the zero it receives on its left-hand side with the current setting of segment $KST_A$ and if both of these inputs are "0" it transmits a signal out over its YES conductor to element 703 which writes new information in the STATUS segment of the position register A for Loop 1 to indicate the latest status of the call and transmits the appropriate signals to update the lamp information for Loop 1 of position A. Element 703 returns control of the processor to executive control EC after having completed its function.

Element 702 transmits a signal out over its NO conductor if $KST_A$ segment is not set to "0." This indicates that the processor cannot for the time being perform the work required to indicate the change in supervisory state of the hold call. This signal is transmitted out over its NO conductor to element 704 which determines whether position A is currently unavailable due to a failure at the position. The failure state of the position is represented by a 6 stored in segment $KST_A$ of the position register. If this is the case, elements 704 detects a comparison between its right- and left-hand inputs and transmits a signal out over its YES conductor to element 705 which causes the processor to update the latest supervisory status of the call in only the position register. No action is taken at this time with respect to the lamp display at the position since it is in a failure status. However, the updating of the status will insure that the call is transferred as in FIGS. 6A and 6B, the true status of supervision for the CLG and CLD parties will be represented on the CLG and CLD lamps at position B. Thus, the status of a held call is preserved even when a failure occurs in a position.

Element $KST_A$ is set to a value of other than 6 whenever the position is not in a failure state. At such times, a signal received by element 704 is transmitted out over its NO conductor since the element does not detect a comparison this signal is applied to delay element 706 which delays the signal a predetermined time and reapplies it to the upper input of element 702 which once again performs its indicated function to determine whether or not position A is now available to serve the request, and performs the work associated with the change in the supervisory state of the call. This looping from the output of delay element 706 continues until element $KST_A$ of the position register is set to "0" and steers the next signal it receives out over its YES conductor to elements 703 to perform the work required at this time.

Figure 8:
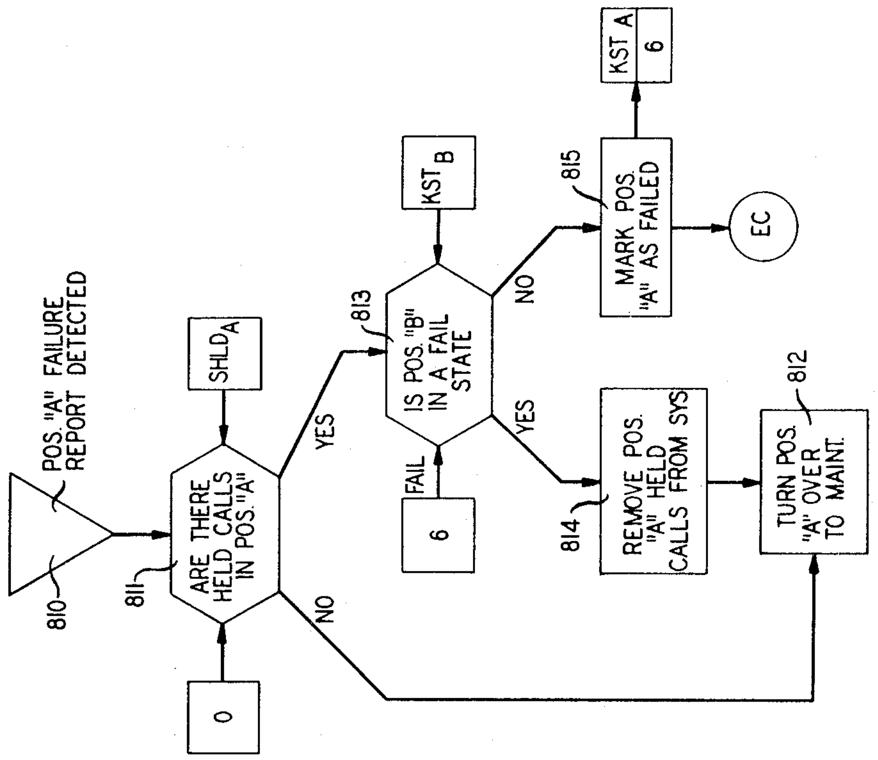

FIG. 8 illustrates the actions that are taken in accordance with our invention whenever a failure at a position is detected. The specific illustration on FIG. 8 assumes that the failure is detected at position A. Element 810 receives the position A failure report and transmits a signal comparison element 811 whose function is to determine whether or not there are currently any calls on hold at position A. Segment $SHLD_A$ of the position register A stores information indicating the number of loops in hold at position A. This is shown on FIG. 5. Element 811 compares this number received from segment $SHLD_A$ with the "0" it receives on its left side. If a comparison is detected, it indicates that no calls are on hold, and a signal is transmitted out over its NO conductor to element 812 which causes the processor to take the necessary action to turn position A over to a maintenance program.

Segment $SHLD_A$ stores a number of other than "0" whenever there are calls on hold at its position. At such times, element 811 does not detect a comparison and it transmits a signal out over its YES conductor to element 813 which determines whether or not position B is in a failure state. This information is supplied by element $KST_B$ of the position register B and element 813 compares the number supplied by the $KST_B$ with the digit 6 received on its left side. As already mentioned, a system state of 6 indicates a failure condition for a position. Thus, element 813 receives a 6 on both its right- and left-hand inputs when position B is in a failure, the element detects the comparison, and transmits a signal out over its YES conductor to element 814 which causes the processor to remove the held calls at position A from the system since with both mate positions in a failure state there are no facilities available for further serving these calls. Element 814 next transmits a signal to element 812 so that the position A may be turned over to the maintenance program.

Element $KST_B$ of the position B register stores a value of other than 6 if its position is not in a failure state. At such times elements 813 does not detect a comparison and it transmits a signal out over its NO conductor to element 815 which causes a digit 6 to be written into segment $KST_A$ of the position A register to indicate its failure state. Element 815 next returns control of the processor to executive control. In this way the held calls are maintained in the system in the face of a failure and the status information updated as described in FIG. 7 until such time as they can be transferred to the mate position for further service as in FIGS. 6A and 6B.

Subsequent to the actions taken as indicated on FIG. 8 the operator at position B will note the failure of position A and will then depress her POS TRANS key. This will cause the system to perform the action shown on FIG. 6A to transfer the held calls at position A to position B.

What is claimed is:

1. In a telephone switching system, a plurality of operator positions, means responsive to the receipt of a call by said system for extending said call to any one of said positions, register means effective during the serving of said call for registering call information including the identity of said one position to which said call is extended, means for entering into said register means information identifying a second position to which the call is to be transferred, and means for transferring said call from said one position to said second position under control of said registered information.

2. The system of claim 1 in combination with means for determining the current operable state of said second position, and means for preventing said transfer in response to a determination that said second position is currently not in an operable state.

3. The system of claim 1 in combination with means for determining the availability of idle call serving facilities at said second position, and means for preventing said transfer in response to a determination that said second position does not currently have the idle facilities required to serve said call.

4. In a telephone switching system, a plurality of operator positions, a plurality of trunk circuits, means responsive to the receipt of a call by one of said truck circuits for extending said call to any one of said positions, a register individual to each of said trunk circuits with each register being effective during the serving of a call by its trunk circuit for registering call information including the identity of the position to which the call received by its trunk circuit is extended, means for entering into the register for said one trunk circuit the identity of a second position to which said call is to be transferred, and means for transferring said call from said one position to said second position under control of the information in said register.

5. The system of claim 4 in combination with means for determining the current operable state of said second position, and means for preventing said transfer in response to a determination that said second position is currently not in an operable state.

6. The system of claim 5 in combination with means for determining the availability of idle call serving facilities at said second position, and means for preventing said transfer in response to a determination that said second position does not currently have the idle facilities required to serve said call.

7. In a telephone switching system, a plurality of operator positions, a plurality of trunk circuits, means responsive to the receipt of a call by one of said trunk circuits for extending said call to any one of said positions, a plurality of trunk registers each of which is individual to a different one of said trunk circuits, a plurality of position registers each of which is individual to a different one of said operator positions, means effective during the serving of each call for entering information into the truck register of the trunk circuit receiving the call with said information including the identity of the position to which the call is extended, means effective during the serving of said call for entering call status information into the position register for said one position to which said call is extended, means for requesting the transfer of said call from said one position to a second one of said positions, means responsive to said request for entering into the trunk register of said one trunk circuit the identity of said second position to which said call is to be transferred, means further responsive to said request for transferring the contents of the position register for said one position to the position register of said second position to which said call is transferred, and means for effecting said transfer under control of the current information in said trunk register.

8. The system of claim 7 in combination with means for determining the current operable state of said second position, and means for preventing said transfer in response to a determination that said second position is currently not in an operable state.

9. The system of claim 8 in combination with means for determining the availability of idle call serving facilities at said second position, and means for preventing said transfer in response to a determination that said second position does not currently have the idle facilities required to serve said call.

10. The system of claim 7 in combination with display facilities at each of said positions, means controlled by said registered information for effecting the display of call information at said one position prior to said transfer, and means controlled by said registered information for effecting the display of call information at said second position subsequent to said transfer.

11. In a telephone switching system, a plurality of operator positions, a plurality of trunk circuits, means responsive to the receipt of a call by one of said trunk circuits for extending a call connection from said one trunk circuit to any one of said positions, a register individual to each of said trunk circuits with each register being effective during the serving of a call by its trunk circuit for registering call information including the identity of the position to which a call received by its trunk circuit is extended over a call connection, means for subsequently releasing said call connection from said one position upon the placing of said call on a hold state, means for entering into the register of said one trunk circuit the identity of a second position to which said call is to be transferred, and means for establishing a call connection from said one trunk circuit to said second position under control of said currently registered information.

12. In a telephone switching system, a plurality of operator positions, a plurality of trunk circuits, means responsive to the receipt of a call by one of said trunk circuits for extending a call connection from said one trunk circuit to any one of said positions, a plurality of trunk registers each of which is individual to one of said trunk circuits, a plurality of position registers each of which is individual to one of said operator positions, means effective during the serving of each call for entering information into the trunk register of the trunk circuit receiving the call with said information including the identity of the position to which the call is extended, means effective during the subsequent serving of said call for entering call status information into the position register for said one position to which said call is extended, means for subsequently releasing said call connection from said one position upon the placing of said call on a hold state, means effective under control of said information in the register of said one position for displaying call status information at said position subsequent to the release of said connection, means at a second one of said position for requesting the transfer of the display of said call status information to said second position, means responsive to said transfer request for entering into the trunk register for said one trunk circuit the identity of said second position to which said call display is to be transferred, means for transferring said display in response to said request from said first position to said second position under control of the information in said trunk register, means responsive to said transfer request for transferring the contents of the position register for said one position to the position register of said second position, means operable under the control of said information in said second position register for displaying the status of said call at said second position, and means subsequently effective under control of said information currently in said trunk register for establishing a call connection from said one trunk circuit to said second position.

13. A method of operating a telephone system comprising: (1) extending a call received by said system to any one of a plurality of operator positions, (2) registering information for said call including the identity of the position to which said call is extended, (3) registering the identity of a second one of said positions to which the call is transferred, and (4) transferring said call from said one position to said second position under control of said registered information.

14. The method of claim 13 in combination with the additional steps of (1) determining the current operational state of said second position; and (2) preventing said transfer if said second position is not currently in an operable state.

15. The method of claim 13 in combination with the additional steps of (1) determining the availability of idle call serving facilities at said second position, and (2) preventing said transfer if said second position does not currently have the idle facilities required to serve said call.

16. A method of operating a telephone system comprising: (1) detecting the receipt of a call by any one of a plurality of trunk circuits, (2) extending said call to any one of a plurality of operator positions, (3) registering in a register individual to said one trunk circuit call information including the identity of said one position to which said call is extended, (4) entering into the register for said one trunk circuit the identity of a second position to which the call is to be transferred, and (5) transferring said call from said one to said second position under control of said registered information.

17. The method of claim 16 in combination with the additional steps of (1) determining the current operational state of said second position; and (2) preventing said transfer if said second position is not currently in an operable state.

18. The method of claim 16 in combination with the additional steps of (1determining the availability of idle call serving facilities at said second position, and (2) preventing said transfer if said second position does not currently have the idle facilities required to serve said call.

19. The method of claim 16 in combination with the additional steps of (1displaying call information at said one position under control of said registered information prior to said transfer, and (2) displaying call information at said second position under control of said registered information subsequent to said transfer.

20. A method of operating a telephone system comprising: (1) extending a call received by any one of a plurality of trunk circuits to any one of a plurality of operator positions, (2) entering into a trunk register individual to said one trunk circuit information including the identity of said one position to which said call is extended, (3) entering call status information into a position register for said one position to which said call is extended, (4) requesting the transfer of said call from said one position to a second one of said position, (5) entering into said trunk register the identity of said second position, (6) transferring the contents of the position register of said one position to a position register of said second position, and (7) transferring the call to said second position under control of the registered information.

21. The method of claim 20 in combination with the additional steps of (1) determining the current operational state of said second position, and (2) preventing said transfer if said second position is not currently in an operable state.

22. The method of claim 20 in combination with the additional steps of (1) determining the availability of idle call serving facilities at said second position, and (2) call serving said transfer if said second position does not currently have the idle facilities required to serve said call.

23. The method of claim 20 in combination with the additional steps of (1) displaying call information at said one position under control of said registered information prior to said transfer, and (2) displaying call information at said second position under control of said registered information subsequent to said transfer.

24. The method of operating a telephone system comprising: (1) detecting the receipt of a call by any one of a plurality of trunk circuits, (2extending a call connection from said one trunk circuit to any one of a plurality of operator positions, (3) entering into a register individual to said one trunk circuit call information including the identity of said one operator position to which the connection is extended, (4) releasing said call connection while placing said call on a hold state, (5) entering into said register for said one trunk circuit the identity of a second one of said positions, and (6) subsequently establishing a call connection from said one trunk circuit to said second positions under control of said registered information.

25. The method of claim 24 in combination with the additional steps of (1determining the current operational state of said second position; and (2) preventing said transfer if said second position is not currently in an operable state.

26. The method of claim 24 in combination with the additional steps of (1) determining the availability of idle call serving facilities at said second position, and (2) preventing said transfer if said second position does not currently have the idle facilities required to serve said call.

27. The method of claim 24 in combination with the additional steps of (1) displaying call information at said first position under control of said registered information prior to the entry of the identity of the second position into said register, and (2) displaying call information at said second position under control of said registered information subsequent to the entry of the identity of the second position into said register.

28. The method of operating a telephone system comprising: (1) receiving a call on any one of a plurality of trunk circuits, (2) extending a call connection from said one trunk circuit to any one of a plurality of operator positions, (3) entering information during the serving of said call into a trunk register for said one trunk circuit with said information including the identity of said one position to which said call is extended, (4) entering call status information into a position register individual to said one position to which said call is extended, (5) subsequently releasing said call connection while placing said call on a hold state, (6) displaying the status of said call at said one position under the control of the information in said position register, (7) receiving from a second operator position a request for the transfer of the supervision of said call to said second position, (8) entering into said trunk register the identity of said second position to which said call supervision is to be transferred, (9) transferring the supervision of said call in response to said request from said one position to said second position under control of the information in said trunk register, (10) transferring the contents of the said position register for said one position to a position register for the said second position, (11) displaying the status of said call at said second position under the control of said information in said last-named position register, and (12) subsequently establishing a call connection from said one trunk circuit to said second position under control of said information in said trunk register.

29. The method of claim 28 in combination with the additional steps of (1) determining the availability of idle call serving facilities at said second position, and (2) preventing said transfer if said second position does not currently have the idle facilities required to serve said call.

30. The method of claim 28 in combination with the additional steps of (1) determining the current operational state of said second position; and (2preventing said transfer if said second position is not currently in an operable state.

31. A method of operating a telephone system having a plurality of trunk circuits in which a received call may be extended from a calling one of said trunk circuits to any one of a plurality of operator positions, actively served at the position to which it is extended, and then placed on hold and disconnected from said position, said method comprising the steps of (1) entering into a trunk register individual said calling trunk circuit information including the identity of said one operator position that initially serves said call, (2) entering supervisory information for said call while in a hold state into a register individual to said position that initially serves said call, (3) displaying supervisory information for said held call at said position that initially serves said call under the control of information in the register individual to said position, (4) extending additional calls one at a time to said position while it is currently displaying supervisory information for said held call, (5) subsequently placing each such additional call in a hold state while displaying it supervisory information at said position, (6) requesting that the supervision of all held calls at said position be transferred to a second position, (7entering the identity of said second position into the trunk register of each held call whose supervision is to be transferred, (8) transferring supervisory call information from the register of said one position to a register of said second position, (9) displaying the supervisory status of the transferred calls at said second position under control of the information transferred to its register, and (10) entering newly received supervisory information for the transferred held calls into the register of said second position.

* * * * *

UNITED STATES PATENT OFFICE

CERTIFICATE OF CORRECTION

Patent No. 3,624,307 Dated November 30, 1971

Inventor(s) Michael F. Sikorsky and Herman E. Voigt

It is certified that error appears in the above-identified patent and that said Letters Patent are hereby corrected as shown below:

Column 1, line 55, "hold" should read -- held --. Column 3, line 18, after "100" delete "(TSPS)" and insert --having--. Column 4, line 43, change "Dobmaier" to --Doblmaier--. Column 7, line 11, after "answer" delete "signals". Column 8, line 1, after "index" change "register" to --registers--. Column 12, line 73, after the comma change "stores" to --store--. Column 13, line 72, after "element" change "$S^A$" to --$SHLD_A$--. Column 14, line 70, after "appropriate" change "command" to --commands--. Column 15, line 5, at the beginning of the line after "were" and before "busy" delete "were", second occurrence. Column 15, line 35, at the beginning of the line after "input" delete "of". Column 19, line 4, after "is" insert --to be--. Column 19, line 32, after "of", first occurrence, change "(1determining" to --(1) determining--. Column 19, line 37, after "of" change "(1displaying" to --(1) displaying--. Column 19, line 63, after "(2)" delete "call serving said transfer if said second position does not currently have the idle facilities required to serve said call" and insert --preventing said transfer if said second position does not currently have the idle facilities required to serve said call--. Column 19, line 74, after the comma change "(2extending" to --(2) extending--. Column 20, line 11, after "of", first occurrence, change "(1determining" to --(1) determining--. Column 20, line 61, after "and" change "(2preventing" to --(2) preventing--. Column 21, line 6, after "displaying" change "it" to --its--. Column 21, line 8, after the comma change "(7entering" to --(7) entering--.

Signed and sealed this 25th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE : 1969 O—366-334